United States Patent [19]
Amata

[11] Patent Number: 4,601,209
[45] Date of Patent: Jul. 22, 1986

[54] ELECTROMAGNETIC FLOWMETER OF THE RESIDUAL MAGNETISM TYPE

[75] Inventor: Yoshitaka Amata, Yokkaichi, Japan

[73] Assignee: Aichi Tokei Denki Co., Ltd., Aichi, Japan

[21] Appl. No.: 722,537

[22] Filed: Apr. 12, 1985

[30] Foreign Application Priority Data

May 16, 1984 [JP] Japan .................................. 59-98207

[51] Int. Cl.$^4$ .............................................. G01F 1/60
[52] U.S. Cl. ................................................ 73/861.17
[58] Field of Search ............ 73/861.12, 861.16, 861.17

[56] References Cited

U.S. PATENT DOCUMENTS

| | | | |
|---|---|---|---|
| 4,210,022 | 7/1980 | Boss | 73/861.17 |
| 4,409,846 | 10/1983 | Ueno | 73/861.12 |
| 4,412,545 | 11/1983 | Okine et al. | 73/861.17 |

Primary Examiner—Herbert Goldstein
Attorney, Agent, or Firm—Pollock, Vande Sande & Priddy

[57] ABSTRACT

An electromagnetic flowmeter has identical exciting coils coupled to portions which exhibit residual magnetism. A control circuit delivers short durations of current to each coil such that the current polarity in each coil determines the polarity of the magnetic flux across the conduit due to each residual magnetic portion. Four states of magnetic flux are repeatedly produced, zero, of one polarity, zero and of the other polarity. Flow note is determined by the difference between sampled voltages in a zero state and a directly succeeding state to eliminate noise components.

8 Claims, 13 Drawing Figures

ELECTROMAGNETIC FLOWMETER OF THE RESIDUAL MAGNETISM TYPE

The present invention relates to an electromagnetic flowmeter of the residual magnetism type.

Figure 1:
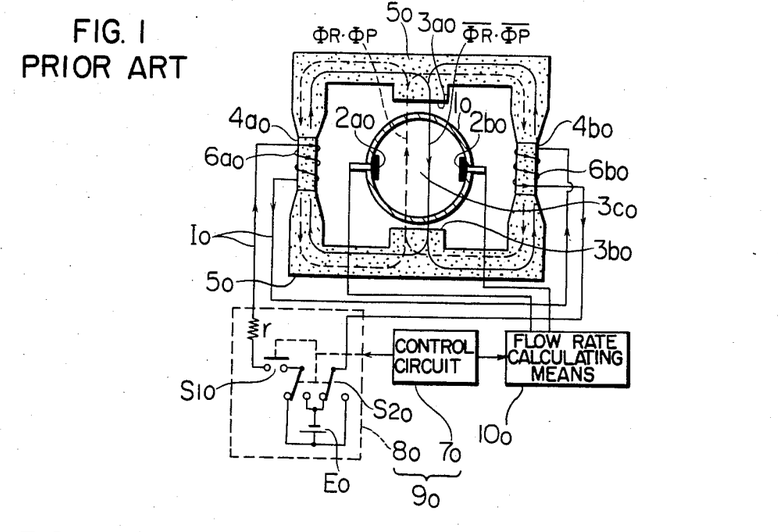
FIG. 1 is a diagram showing the circuit connection of the conventional residual magnetism type electromagnetic flowmeter.

There is a prior art like this invention, for example, as shown in FIG. 1 which is a diagram showing the connection thereof (reference is made to Japanese Patent Publication No. 59-007930 and U.S. Pat. No. 4,409,846).

Figure 2:
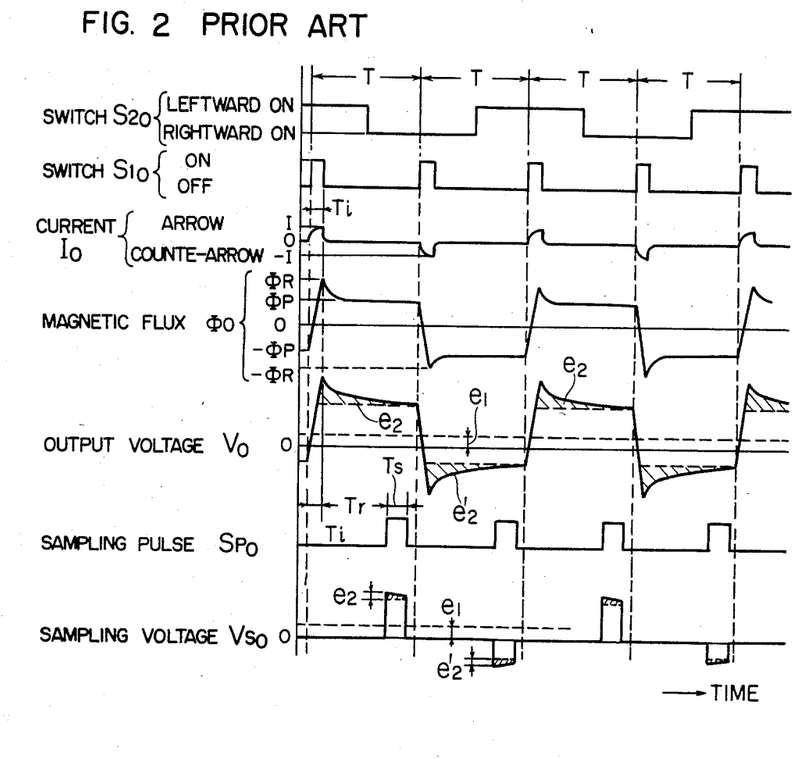
FIG. 2 is a diagram showing the operational waveforms for explaining the operations of the circuit of FIG. 1.

The prior art relates to an electromagnetic flowmeter of the residual magnetism type which comprises a pair of electrodes $2ao$ and $2bo$, a magnetic circuit $5o$ having a pair of magnetic poles $3ao$ and $3bo$, and a pair of exciting coils $6ao$ and $6bo$. The pair of electrodes $2ao$ and $2bo$ are disposed to face the flow of an electrically conductive fluid passing through a pipe $1o$ made of a non-magnetic and electrically non-conductive material, the electrodes $2ao$ and $2bo$ being separated from each other in the direction intersecting the flow. Between two pair of magnetic poles $3ao$ and $3bo$, there is a magnetic flux gap $3co$ through which magnetic flux passes while intersecting imaginary lines connecting the pair of electrodes $2ao$ and $2bo$ with each other as well as intersecting the above-mentioned flow. The magnetic circuit includes retentivity portions $4ao$ and $4bo$ disposed parallelly with each other but each connected serially with the magnetic flux gap $3co$. The retentivity portions $4ao$ and $4bo$ are made of a magnetically hard or semihard material identically with each other such that residual magnetism remains at the retentivity portions $4ao$ and $4bo$ after a magnetic field exerted to these portions to magnetize them has been removed therefrom. The other portions of the magnetic circuit are made of a magentically soft material. The pair of exciting coils $6ao$ and $6bo$ are disposed so as to be electromagnetically coupled individually respectively with the retentivity portions $4ao$ and $4bo$, and connected in series with each other in such a relation that magnetic flux of the same polarity is caused to appear in the magnetic flux gap $3co$ due to the magnetization of the respective retentivity portions $4ao$ and $4bo$ when a current is caused to flow in the exciting coils. Further, the current flowing in the series connection of the exciting coils $6ao$ and $6bo$ is controlled by an excitation control means $9o$ including a switching circuit $8o$ controlled by a control circuit $7o$, in such a manner that the current flows at a regular interval T, as shown in FIG. 2, and is allowed to intermittently flow every time for a very short duration Ti, the direction of the intermittently flowing current being alternately changed, between a forward direction as indicated by an arrow at the current Io in FIG. 1 and a reverse direction in opposition thereto, such that the polarity of the magnetic flux appearing at the magnetic flux gap $3co$ due to the magnetization of the retentivity portions $4ao$ and $4bo$ by the intermittently flowing current is changed alternately. The control circuit $7o$ produces a sampling pulse signal Spo having a predetermined sampling duration Ts which has been set to occur in a predetermined period of time after the end of every intermittently flowing current and before the initiation of the next conduction of the intermittently flowing current, as shown in FIG. 2. A flow rate calculating means $10o$ receives the sampling pulse signal Spo and an output voltage Vo produced between the pair of electrodes $2ao$ and $2bo$ so as to successively detect a sampled voltage Vso which is a value of the output voltage in the period Ts of the sampling pulse Spo in every time the sampling pulse is generated in order to thereby calculate the flow rate of the above-mentioned fluid on the basis of the difference between two adjacent sampled voltages.

The switching circuit $8o$ includes a current conduction switch $S1o$ disposed between a DC power source Eo and the series connection of the exciting coils $6ao$ and $6bo$ for directly controlling the current conduction timing as well as the current conduction period Ti, and a current direction change-over switch $S2o$ connected in series with the switch $S1o$ for changing-over the connection polarity of the DC power source Eo, the control circuit $7o$ causing these switches $S1o$ and $S2o$ to operate in accordance with the respective programs as shown in the waveforms $S1o$ and $S2o$ in FIG. 2.

Figure 3:
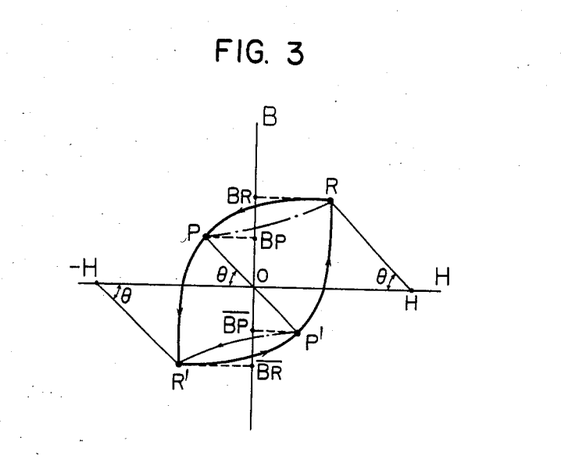
FIG. 3 is a diagram showing a B-H characteristic at the retentivity portions in each of the prior art of FIG. 1 and at the retentivity portions in an embodiment of the present invention of FIG. 4.

In the prior art as shown in FIG. 1, even though the above-mentioned short duration conduction current Io flows in either direction, forward or reverse, the current Io gradually increases in its absolute value until it reaches a predetermined maximum value I and immediately thereafter sharply decreases to zero (waveform Io in FIG. 2). Thus, assuming now that the strength of the magnetic field acting on the exerting coils $6ao$ and $6bo$ repeats the change of $\rightarrow H \rightarrow O \rightarrow \overline{H} \rightarrow O$ (the bar on a character represents negative or reverse) due to the repetition of the change $\rightarrow I \rightarrow O \rightarrow \overline{I} \rightarrow O$ of the current Io and the magnetic flux density B at the retentivity portions $4ao$ and $4bo$ repeats the change $\rightarrow BR \rightarrow BP \rightarrow \overline{BR} \rightarrow \overline{BP}$ corresponding to the respective points $\rightarrow R \rightarrow P \rightarrow R' \rightarrow P'$ along the solid line of the B - H diagram of FIG. 3 (in FIG. 3, "$\theta$" is a constant value determined by the geometrical shape of the magnetic circuit $5o$, etc.), the magnetic flux appearing at the magnetic flux gap $3Co$ alternately passing through the paths respectively indicated by a solid line and a dotted line in the respective arrow-directions in FIG. 1 corresponding to the change-over of the current conduction between its forward and reverse directions repeats the change as shown in the waveform $\Phi_o$ in FIG. 2. Since the magnetic flux density distribution rate in the magnetic flux gap $3Co$ is considered to be constant, the magnetic flux density at various portions in the magnetic flux gap changes in proportion to the magnetic flux $\Phi_o$. As the result of integration of the product of the flow rate by the magnetic flux density at various portions of the magnetic flux gap, an output voltage Vo is produced between the electrodes $2ao$ and $2bo$, the polarity of the output voltage being changed alternately as shown in the waveform Vo in FIG. 2.

The output voltage Vo is a sum in which a DC type noise component $e_1$ and an AC type noise component $e_2$ or $e_2'$, which changes its polarity in accordance with the direction of change, that is increase or decrease, of a signal component proportional to the flow rate, are added to this signal component.

The DC type noise component $e_1$ is caused by the electrochemical change in the electrodes $2ao$ and $2bo$ and maintained continuously.

On the contrary, the AC type noise component $e_2$ or $e_2'$ is caused by the sharp increase or decrease in the magnetic flux $\Phi_o$ and includes a portion gradually attenuated until the occurrence of the next sharp increase or decrease in the magnetic flux. Accordingly, in the case where the regular interval T of the interruption of the current conduction is set to a value small enough to sufficiently maintain the responsiveness of the change in the measurement value corresponding to the actual flow rate change, the sampled voltage Vso may include not only the DC type noise component $e_1$ but also the AC type noise component $e_2$ or $e_2'$ in addition to the signal component proportional to the flow rate, even if the timing of the sampling pulse Spo is set at a point of time immediately before the next current conduction, as shown in the waveform Vso in FIG. 2.

These noise components are not always constant among individual flowmeters due to manufacturing variations or errors and there occurs, of course, aging in the individual flowmeters. Accordingly, it is impossible to avoid errors in measurement unless the above-mentioned defects are eliminated in calculating the flow rate.

Among these noise components, the DC type noise component $e_1$ can be eliminated by calculating the difference between successively generated sampled voltages Vso when the flow rate is calculated in the flow rate calculating means 10o. On the contrary, the AC type noise components $e_2$ and $e_2'$ can not be deleted by the prior art as shown in FIG. 1. Such an AC type noise component causes errors in measurement and therefore provides a significant defect in the prior art.

The residual magnetism type electromagnetic flowmeter is advantageous in that the power consumption is very few because a short duration current is used as an exciting current in comparison with the conventional electromagnetic flowmeter employing a square wave current.

An object of the present invention is therefore to provide a residual magnetism type electromagnetic flowmeter in which the above-mentioned defect in the prior art is eliminated without losing such an advantage as described above.

The above and other objects, features, and advantages of the present invention will be more apparent from the following description with reference to the accompanying drawings, in which:

Figure 4:
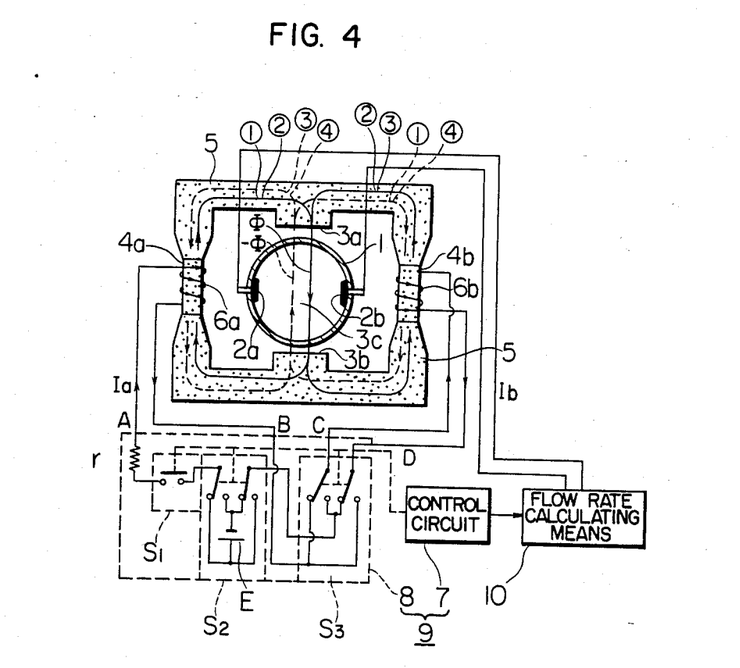
FIG. 4 is a diagram showing the circuit connection of an embodiment of the present invention.

Referring to FIG. 4 showing a connection diagram, an embodiment of the residual magnetism type electromagnetic flowmeter according to the present invention comprises a pair of electrodes 2a and 2b, a magnetic circuit 5 having a pair of magnetic poles 3a and 3b, a pair of exciting coils 6a and 6b, an excitation control means 9, and a flow rate calculating means 10. The pair of electrodes 2a and 2b are disposed to face a flow of an electrically conductive fluid passing through a pipe 1 made of a non-magnetic and electrically non-conductive material, the electrodes being separated from each other in direction intersecting the flow. Between the pair of magnetic poles 3a and 3b, there is a magnetic flux gap 3c through which magnetic flux passes while intersecting imaginary lines connecting the pair of electrodes 2a and 2b with each other as well as intersecting the above-mentioned flow. The magnetic circuit includes identical retentivity portions 4a and 4b disposed magnetically parallelly with each other but each connected magnetically serially with the magnetic flux gap 3c. In the retentivity portions 4a and 4b, residual magnetism remains after a magnetic field exerted to magnetize these portions has been removed. The pair of exciting coils 6a and 6b are disposed so as to be electromagnetically coupled individually respectively with the retentivity portions 4a and 4b. The excitation control means 9 is arranged to cause identical short duration current conductions simultaneously intermittently through the respective exciting coils 6a and 6b, the respective directions of the currents intermittently passing through the excitation coils being controlled such that the respective polarities of the magnetic fluxes appearing at the magnetic flux gap 3c respectively due to the magnetization of each retentivity portions 4a and 4b by the intermittent flowing current conductions are changed through cycles each including four states, that is a first one where they are opposite to each other, a second one where they are the same one polarity, a third one where they are opposite to each other again, and a fourth one where they are the same other polarity, repeatedly in this order. The flow rate calculating means 10 is arranged such that it successively obtains values of sampled voltage Vs each of which is a value of a portion of an output voltage V appearing between the electrodes 2a and 2b in a predetermined period Ts which is set to occur in a predetermined period of time after the completion of every current conduction and before initiation of the next current conduction, and makes differences between two values of adjacent sampled voltage Vs obtained in the above-mentioned first and second states respectively, and in the above-mentioned third and fourth states respectively by subtracting the value of the sampled voltage obtained in the state where the above-mentioned respective polarities of the induced magnetic flux are opposite to each other from the value of the sampled voltage obtained in the directly succeeding state where the respective polarities of the induced magnetic flux are the same with each other, thereby calculates the flow rate of the above-mentioned flow on the basis of the differences between two values of adjacent sampled voltage obtained in a manner as described above.

In the embodiment the circuit connection of which is shown in FIG. 4, the pipe 1, the electrodes 2a and 2b, the magnetic poles 3a and 3b, the retentivity portions 4a, and 4b, the magnetic circuit 5, and the exciting coils 6a and 6b, and the mutual relations thereamong are quite the same as those components in the same name and having the same reference numerals with suffix "o", that is, 1o, 2ao, 2bo, 3ao, 3bo, 4ao, 4bo, 5o, 6ao, and 6bo, and the mutual relations thereamong in prior art of FIG. 1, except the relation of connection between the exciting coils 6a and 6b. The relation of connection between the exciting coils 6a and 6b, the excitation control means 9 constituted by a control circuit 7 and a switching circuit 8, the flow rate calculating means 10, and the relation between these means 9 and 10 are different from the relation of connection between the corresponding components 6ao and 6bo in the same name, the corresponding mean 9o constituted by the corresponding components 7o and 8o, and the corresponding means 10o, and the relation between these means 9o and 10o, in the following points.

A DC power source E, a current conduction switch S1, and a current direction change-over switch S2 in the switching circuit 8 are the same as those corresponding components Eo, S1o, and S2o in the same name in the corresponding switching circuit 8o of the prior art, but the switching circuit 8 is further provided with a coil direction change-over switch S3 for changing-over the direction of one of the exciting coils 6a and 6b which are connected in series with each other. More in detail, the switch S3 changes over the respective connecting designations of the opposite ends of the one exciting coil 6b, therebetween.

Figure 5:
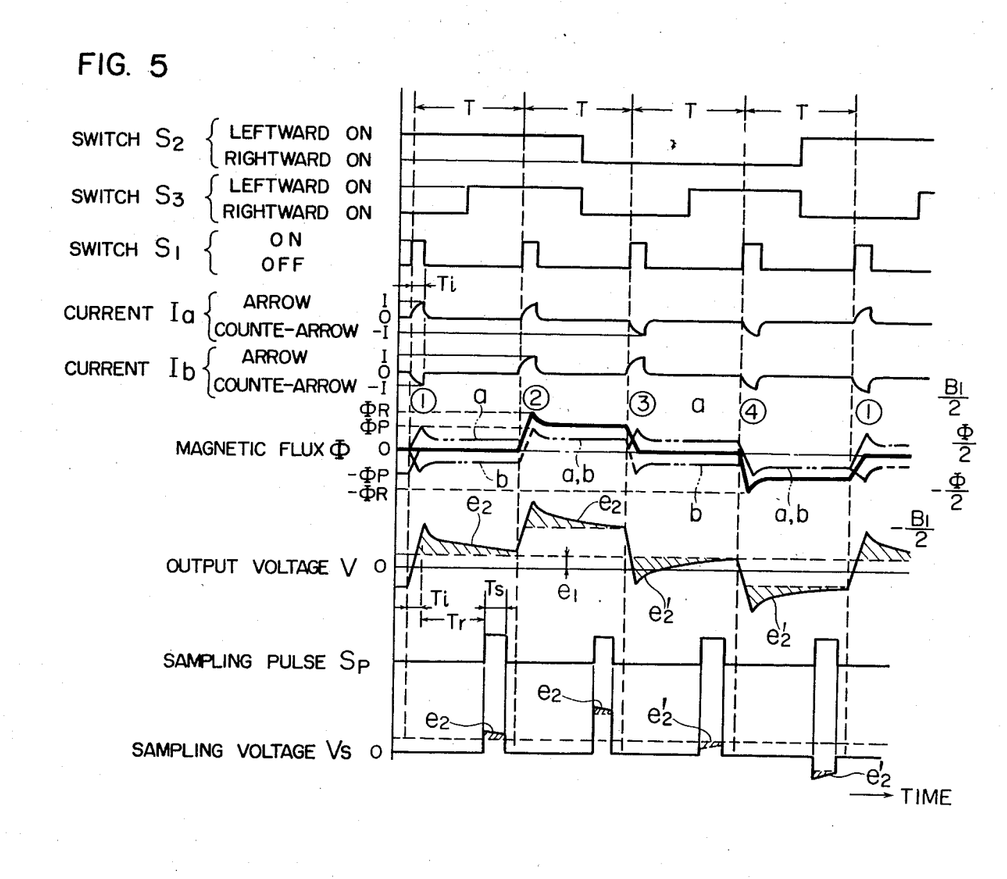
FIG. 5 is a diagram showing the operational waveforms for explaining the operations of the embodiment of FIG. 4.

The control circuit 7 produces a sampling pulse Sp as shown in FIG. 5 in the same manner as the sampling pulse Spo of the prior art as shown in FIG. 1, but the circuit 7 is different from the corresponding control circuit 7o of the prior art in the point it causes the current conduction switch S1, the current direction change-over switch S2, and the coil direction change-over switch S3 to operate in accordance with the sequence as shown in FIG. 5.

As the result, currents Ia and Ib which change through the values →I→O→I→O→Ī→O→Ī→O and →Ī→O→I→O→I→O→Ī→O, respectively, are caused to flow in the exciting coils 6a and 6b, respectively, as seen in FIG. 5. In FIG. 4, the arrows attached to the exciting coils 6a and 6b indicate the forward direction of the current passing through the coils. The value Ī represents the reversed value of I, that is the current flowing in the reverse direction. As to each of these forward and reverse currents, the absolute value thereof first gradually increases until it reaches a predetermined maximum value I at the rear end of the short on-period Ti of the current conduction switch S1, and comes back to O immediately thereafter. Such short duration current conduction is successively intermittently performed through the respective states where the short duration currents are caused to pass through the exciting coils 6a and 6b in the directions opposite to each other, in one directions identical with each other, in the directions opposite to each other, and in the other directions identical with each other, repeatedly in this order, so that in this duration of all of these states, the strengths of the respective magnetic fields change through the states of →H→O→H →O→H̄→O→H̄→O, and →H̄→O→H→O→H→O→H̄→O respectively and the magnetic flux densities B at the respective retentivity portions 4a and 4b change correspondingly through →BR→BP→BR→BP→B̄R→B̄P→B̄R→B̄P, and →B̄R→B̄P→BR→BP→BR→B̄P→B̄R corresponding to the respective points →R→P→R→P→R'→P'→R'→P', and →R'→P'→R→P→R→P→R'→P' along the arrow-directions of the solid and one-dotted chain lines respectively in the diagram of FIG. 3. As the result, the respective magnetic fluxes Φ, which are caused by the magnetization of each retentivity portions 4a and 4b and which pass in the magnetic circuit 5 through the paths respectively indicated by the solid and dotted lines in FIG. 4 corresponding to the forward and reverse directions of the current conduction and appear at the magnetic flux gap 3c, change through first state where the respective polarities of the magnetic flux are opposite to each other, second state where they are the same in one polarity, third state where they are opposite to each other, and fourth state where they are the same in the other polarity repeatedly in this order as shown by the two-dotted chain lines a and b in the waveform Φ in FIG. 5, so that the whole of the magnetic flux changes its polarity through O, one polarity, O, and the other polarity, repeatedly in this order as shown by a solid line in the waveform Φ in FIG. 5. Thus, an output voltage V is successively produced between the electrodes 2a and 2b due to the whole of the magnetic flux density proportional to the magnetic flux Φ at various portions in the magnetic flux gap 3c and the flow of the fluid, in such a manner that the output voltage V takes a first value containing only the DC type and AC type noise components $e_1$ and $e_2$ in first period T, a second value containing the DC type and AC type noise components $e_1$ and $e_2$ in addition to the signal component having one polarity and being proportional to the flow rate in second period T, a third value containing only the DC type and AC type noise components $e_1$ and $e_2'$ in third period T, and a fourth value containing the DC type and AC type noise components $e_1$ and $e_2'$ in addition to the signal component having the other polarity and being proportional to the flow rate in fourth period T, as shown in FIG. 5, these values being repeated in this order.

The flow rate calculating means 10 successively receives a sampling pulse Sp produced by the control circuit 7 and having a predetermined sampling duration Ts which has been set to occur in a predetermined period of time after the end of every intermittently flowing current and before the initiation of the next conduction of the intermittently flowing current and receives, at the same time, an output voltage V produced between the pair of electrodes 2a and 2b, so as to successively detect a sampling voltage Vs which is a value of the output voltage V in the period Ts of the sampling pulse Sp in every time the sampling pulse is generated, thereby calculating the flow rate of the above-mentioned fluid on the basis of the difference between two values of adjacent sampled voltage obtained by subtracting the value of the sampled voltage in the period where the respective magnetic flux have opposite polarities to each other from the value of the sampled voltage in the immediately after period where the respective magnetic flux have the same polarity. In the thus calculated value of the flow rate, not only the DC type noise component $e_1$ but also the AC type noise component $e_2/e_2'$ are completely eliminated.

In the embodiment having a circuit arrangement as shown in FIG. 4, the whole of the circuit 8 constituted by the current conduction switch S1, the current direction change-over switch S2, and the coil direction change-over switch S3 may be replaced by an electronic circuit which may be integrated into one electronic circuit with the control circuit 7 and the flow rate calculating means 10.

Figure 6:
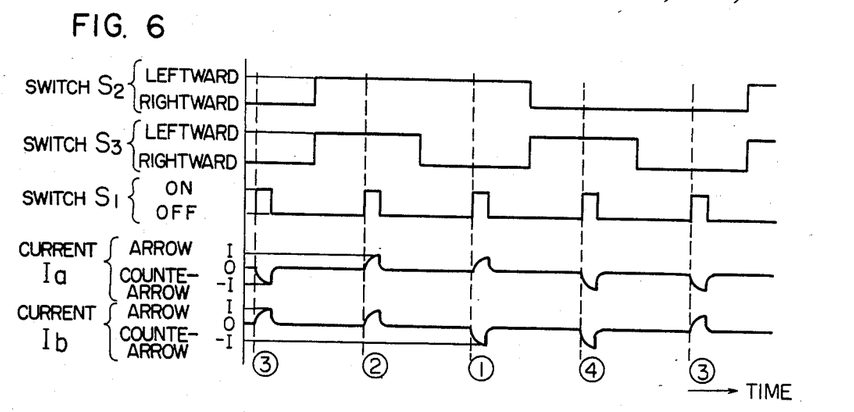
FIGS. 6, 7, and 8 are diagrams respectively showing the operational waveforms for explaining the operations of control circuits different from the control circuit shown in FIG. 4.
Figure 7:
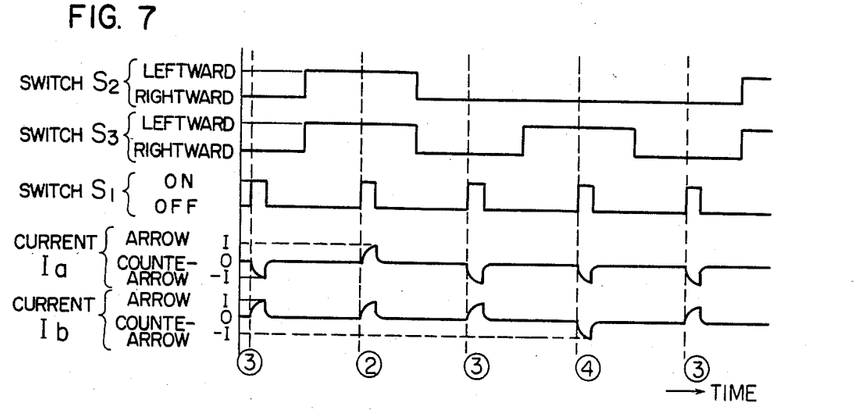
Figure 8:
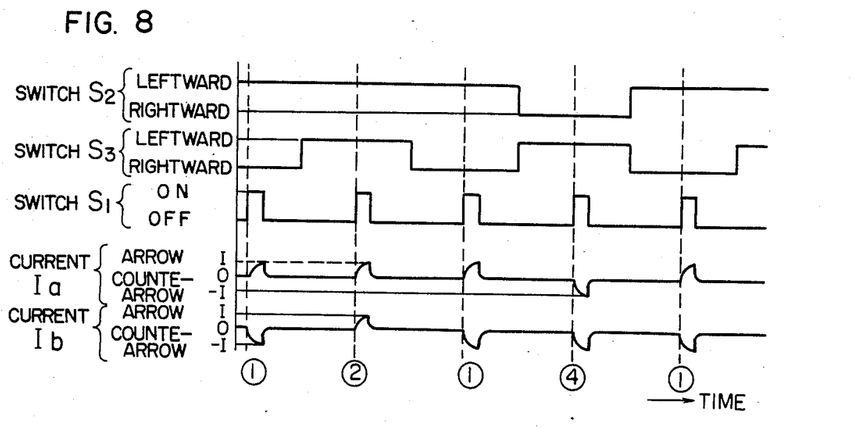

As the program for performing the operations of the switches S1, S2, and S3 by the control circuit 7, the programs shown in FIGS. 6, 7, and 8 may be used in place of the program shown in FIG. 5, and in this case currents 6a and 6b flow in the exciting coils 6a and 6b respectively as shown in FIGS. 6, 7, and 8 respectively so as to produce magnetic flux Φ similar to that indicated by a solid line in the waveform of Φ in FIG. 5 at the magnetic flux gap 3c, whereby the flow rate calculating means 10 calculates the flow rate on the basis of the sampled voltage Vs shown in FIG. 5, the noise components $e_1$, $e_2$, and $e_2'$ being thus eliminated.

Figure 9:
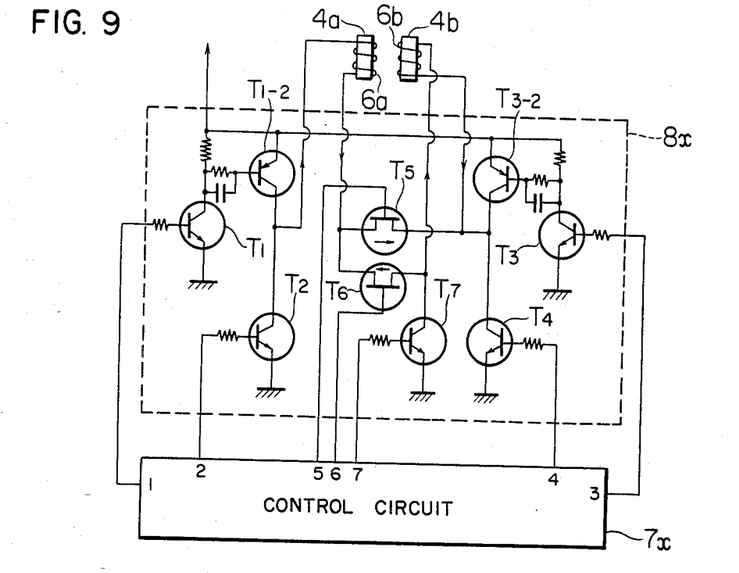
FIG. 9 is a circuit diagram showing an excitation control means as another embodiment.
Figure 10:
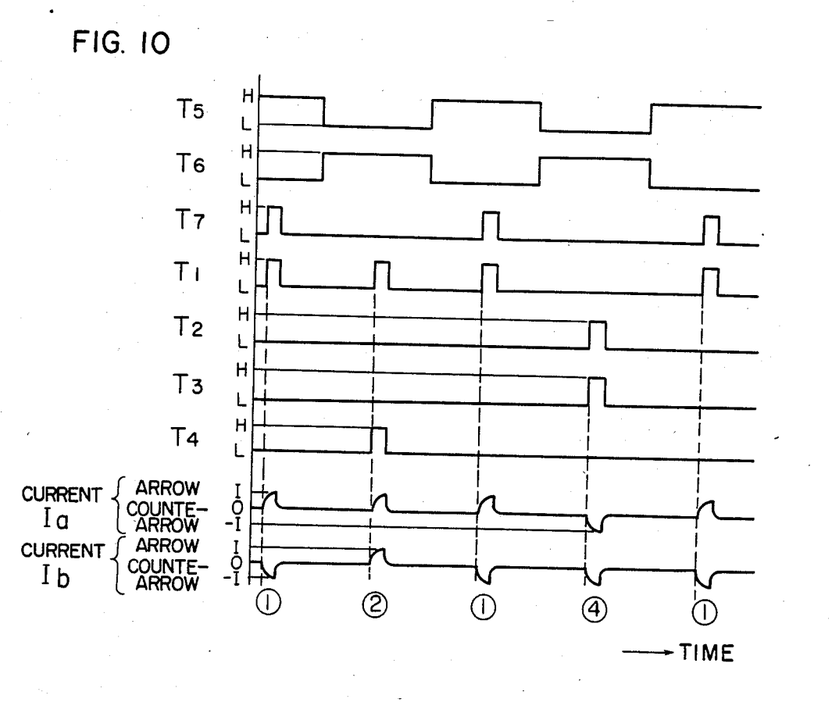
FIG. 10 is a diagram showing the operational waveforms for explaining the operations of the embodiment shown in FIG. 9.

In the embodiment of FIG. 4, the switching circuit 8 may be replaced by a switching circuit 8x as shown in FIG. 9 and the control circuit 7 may be replaced by a control circuit 7x which controls the respective potentials at input terminals of transistors T1, T2, T3, T4, T5, T6 and T7 to change as shown in the respective waveforms T1, T2, T3, T4, T5, T6 and T7 in FIG. 10, so that currents Ia and Ib flow in the exciting coils 6a and 6b respectively as shown in FIGS. 10 similarly to the case of FIG. 8 and the flow rate calculating means 10 similarly calculates the flow rate in which the noise components $e_1$, $e_2$, and $e_2'$ are eliminated.

Figure 11:
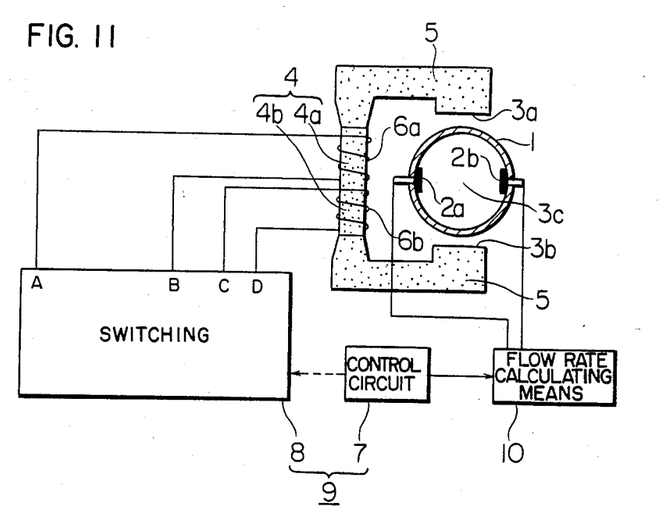
FIGS. 11, 12, and 13 are diagrams showing the respective circuit connections of other embodiments of the present invention.

FIG. 11 shows another embodiment which is arranged similarly to the FIG. 4 embodiment except that an upper half portion and a lower half portion of a single bar-like retentivity portion 4 as shown in the drawing are used as a series connection of two retentivity portions 4a and 4b, and which operates in the same manner as the FIG. 4 embodiment.

Figure 12:
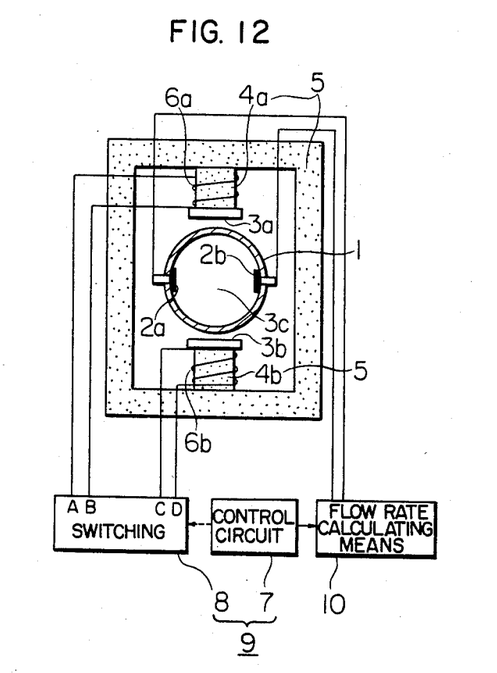

FIG. 12 shows a further embodiment which is arranged similarly to the FIG. 4 embodiment except that two retentivity portions 4a and 4b disposed in series with and adjacent to magnetic poles 3a and 3b in the magnetic circuit 5, and which operates in the same manner as the FIG. 4 embodiment.

Figure 13:
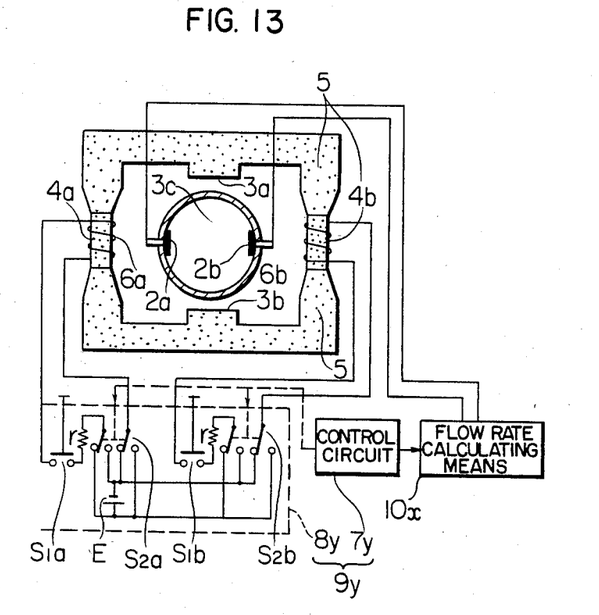

FIG. 13 shows a still further embodiment which is arranged such that in the FIG. 4 embodiment the switching circuit 8 is replaced by a switching circuit 8y constituted by a pair of current conduction switches S1a and S1b and a pair of current direction change-over switches S2a and S2b respectively individually for the exciting coils 6a and 6b, and the control circuit 7 is replaced by a control circuit 7y which controls individually the switches S1a, S2a, S1b, and S2b so as to cause currents Ia and Ib to flow in the exciting coils 6a and 6b in accordance with the sequence as shown in the waveforms Ia and Ib in FIG. 5, and which operates in the same manner as the FIG. 4 embodiment.

Further, in each of the above embodiments, in place of the arrangement of the magnetic circuit 5 constituted by the retentivity portions 4a and 4b and the other portions made of a soft material, the whole of the magnetic circuit may be constituted by the retentivity portions made of an ordinary magnetically semihard steel material.

Thus, in the residual magnetism type electromagnetic flowmeter according to the present invention, the magnetic flux appearing at the magnetic flux gap 3c changes through the states where its polarity is O, one polarity, O, and the other polarity, repeatedly in this order, and the successively obtained sampled voltage Vs takes a value containing only the sum of the DC type noise component $e_1$ and the AC type noise component $e_2/e_2'$ which are respectively independent of and dependent on the direction of change, increase or decrease, of the signal component proportional to the flow rate in a certain period, and then takes a value containing the signal component in addition to the above-mentioned sum in the next period, the flow rate being calculated on the basis of these values of the sampled voltage Vs.

According to the present invention, even if the sampled voltage may contain a DC type noise component, an AC type noise component, and/or other noise components caused by a similar tendency, the flow rate can be measured under the conduction that such noise components are substantially completely eliminated while maintaining the advantage of a few current consumption owing to the fact that the electromagnetic flowmeter is of the residual magnetism type, thereby attaining the above-mentioned object of the invention, without substantially changing in cost from the prior art because the arrangement is not particularly complicated.

The present invention is not restricted to the embodiments disclosed in this application but all of the modifications included in the scope of the invention defined in the appended claims is included in the present invention.

I claim:

1. A residual magnetism type electromagnetic flowmeter comprising:
   a pair of electrodes disposed to face a flow of an electrically conductive fluid passing through a pipe made of a non-magnetic and electrically non-conductive material, said electrodes being separated from each other in direction intersecting said flow;
   a magnetic circuit including a pair of magnetic poles, a magnetic flux gap formed between said pair of magnetic poles such that magnetic flux passes through said magnetic flux gap while intersecting imaginary lines connecting said pair of electrodes with each other as well as intersecting said flow, and a pair of retentivity portions made identically with each other and disposed magnetically parallel or serially with each other but each connected magnetically serially with said magnetic flux gap, said retentivity portions being arranged such that residual magnetism remains upon removing a magnetic field exerted thereon to magnetize said portions;
   a pair of exciting coils arranged to be identical with each other and to be electromagnetically coupled individually respectively with said retentivity portions;
   an excitation control means for performing identical short duration current conductions simultaneously intermittently through said respective exciting coils, and for controlling the respective directions of the current conduction such that the respective polarities of the magnetic fluxes appearing at said magnetic flux gap respectively due to the magnetization of each said retentivity portions by the intermittent current conductions change through predetermined states repeatedly in a predetermined order such that the respective polarities of the magnetic flux appearing at said magnetic flux gap are opposite to each other, are identical with each other in one polarity, are opposite to each other, and are identical with each other in the other polarity, and
   a flow rate calculating means for successively obtaining values of sampled voltage each of which is a value of a portion of an output voltage appearing between said electrodes in a predetermined period which is set to occur in a predetermined period of time after the completion of every current conduction by said excitation control means and before initiation of the next current conduction, and for calculating the flow rate of said fluid on the basis of differences obtained by subtracting a value of said sampling voltage obtained in the state where said respective polarities of said magnetic flux at said magnetic gap are opposite to each other from a value of said sampling voltage obtained in the immediately succeeding state where said respective polarities of said magnetic flux are identical with each other in the one or the other polarity.

2. A residual magnetism type electromagnetic flowmeter according to claim 1, in which said retentivity portions are arranged magnetically in parallel with each other within said magnetic circuit.

3. A residual magnetism type electromagnetic flowmeter according to claim 1, in which said retentivity portions are arranged in series with each other within said magnetic circuit.

4. A residual magnetism type electromagnetic flowmeter according to claim 3, in which said retentivity portions are formed in a body.

5. A residual magnetism type electromagnetic flowmeter according to claim 3, in which said retentivity portions are formed separately with each other within said magnetic circuit, and are arranged close to said magnetic poles respectively.

6. A residual magnetism type electromagnetic flowmeter according to claim 5, in which the respective centers of said retentivity portions, said magnetic poles, and said pipe line are substantially aligned on a straight line.

7. A residual magnetism type electromagnetic flowmeter according to claim 1, in which said retentivity portions are made of a hard magnetic material, while the remaining portions of said magnetic circuit are made of a soft magnetic material.

8. A residual magnetism type electromagnetic flowmeter according to claim 1, in which the whole of said magnetic circuit including said retentivity portions is made of a hard magnetic material.

* * * * *